INFORMATION SYSTEM

Filed Feb. 24, 1971

3 Sheets-Sheet 1

INVENTOR.
JEROME H. LEMELSON
BY

INVENTOR.
JEROME H. LEMELSON

Jan. 23, 1973 J. H. LEMELSON 3,712,956

INFORMATION SYSTEM

Filed Feb. 24, 1971 3 Sheets-Sheet 3

INVENTOR.
JEROME H.LEMELSON

United States Patent Office 3,712,956
Patented Jan. 23, 1973

3,712,956
INFORMATION SYSTEM

Jerome H. Lemelson, 85 Rector St., Metuchen, N.J. 08840

Continuation-in-part of applications Ser. No. 225,173, Aug. 27, 1962 and Ser. No. 267,377, Mar. 11, 1963. This application Feb. 24, 1971, Ser. No. 118,424
Int. Cl. G11b *15/00, 27/32;* H04n *1/28*
U.S. Cl. 178—6.6 A 12 Claims

ABSTRACT OF THE DISCLOSURE

An information storage system for storing document information, retrieving same and performing operations with respect to said information. The information is stored in the form of video signals capable of generating still images on a viewing screen. In one form, the image information is generated as a plurality of lines of alphanumeric characters such as generated by a computer or by means of reproduced video picture signals stored on magnetic tape and selectively reproduced to generate visual images of typewritten lists of words such as catalog information, descriptions of data, formulas, etc. Upon visually monitoring said information, the persons reading same is provided with and activates manual control means for generating electrical signals representative of a selected of said lines of characters, part of a line or a plurality of lines which signals may be in code or video form capable of being used by a computer. The code signals may be generated by operating on the portion of the video signal reproduced in scanning the selected portion of the image being viewed on a cathode ray tube screen or by scanning and reproducing selected portions of the video signal containing information which is recorded in code form such as characterized by variations in amplitude and/or frequency and provided in predetermined locations with respect to respect portions of the video signal representative of a line of characters and capable of modulating a cathode ray tube read beam to generate said characters on a viewing screen.

Selective reproduction of information representative of a line of characters or groups of characters may be effected in a number of manners such as by generating a code signal which is operative to effect the selective reproduction of that portion of the video picture signal recording from which the monitored image was generated or the desired code signal from a recording on the same record member containing the video picture signal recording used to generate the monitored image and the selected line of characters. Said selective reproduction of information representative of a selected line of characters viewed by the operator of the apparatus may also be effected by the operator's causing the read beam of the cathode ray tube being scanned or monitored to scan either the selected line of characters and logically operate on the video signal so generated to generate said code signals representative thereof or to scan coded information generated as spots or variations in color or grey scale along, above or below the selected line of characters to generate said code signals. In yet another form, a manually guided or otherwise directed photooptical means such as a photocell or light pen is employed to scan the line of characters or visual code information associated with said line to generate the desired code information as electrical signals which may be used by a computer.

RELATED APPLICATIONS

This is a continuation-in-part of application Ser. No. 225,173, filed Aug. 27, 1962 for Videotape Recording.

SUMMARY OF THE INVENTION

This invention relates a system for storing information on magnetic tape. The system is particularly applicable for the storing of analog signals which are representative of alpha-numeric characters generated as the output of a computer such as a digital computer.

Prior to the making of the instant invention, it was the practice to record the output of digital computers by printing characters as lines of parallel lines on long sheets of paper fed from a roll. Depending on the computational speed of the computer, the daily output of a typical digital computer has amounted to hundreds of pounds of paper which is not only costly but also bulky and requires relatively large storage space. Scanning such paper for selected information is also a relatively tedious task. The instant invention provides an apparatus for recording the output of a digital computer on magnetic tape or other suitable storage medium in a form whereby it may be easily reproduced and used to generate still images on the face of an electronic display screen such as the face of a cathode ray tube. Accordingly it is a primary object of this invention to provide a new and improved apparatus and method for storing a reproducing from storage digital information in a form other than binary or pulse form.

Another object is to provide a magnetic recording apparatus which may receive binary codes directly from a digital computer and convert same to analog form without the need for a digital-to-analog converter.

Another object is to provide a magnetic recording system for the output of a digital computer for recording a large amount of character information at a higher density than possible using conventional printout or digital recording techniques.

Another object is to provide an apparatus and method for recording a large amount of computer generated information in a form whereby it may be easily converted to visual form on a display screen and selected portions thereof readily derived from storage upon command for monitoring without difficulty.

With the above and such other objects in view as may hereafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

Figure 1:
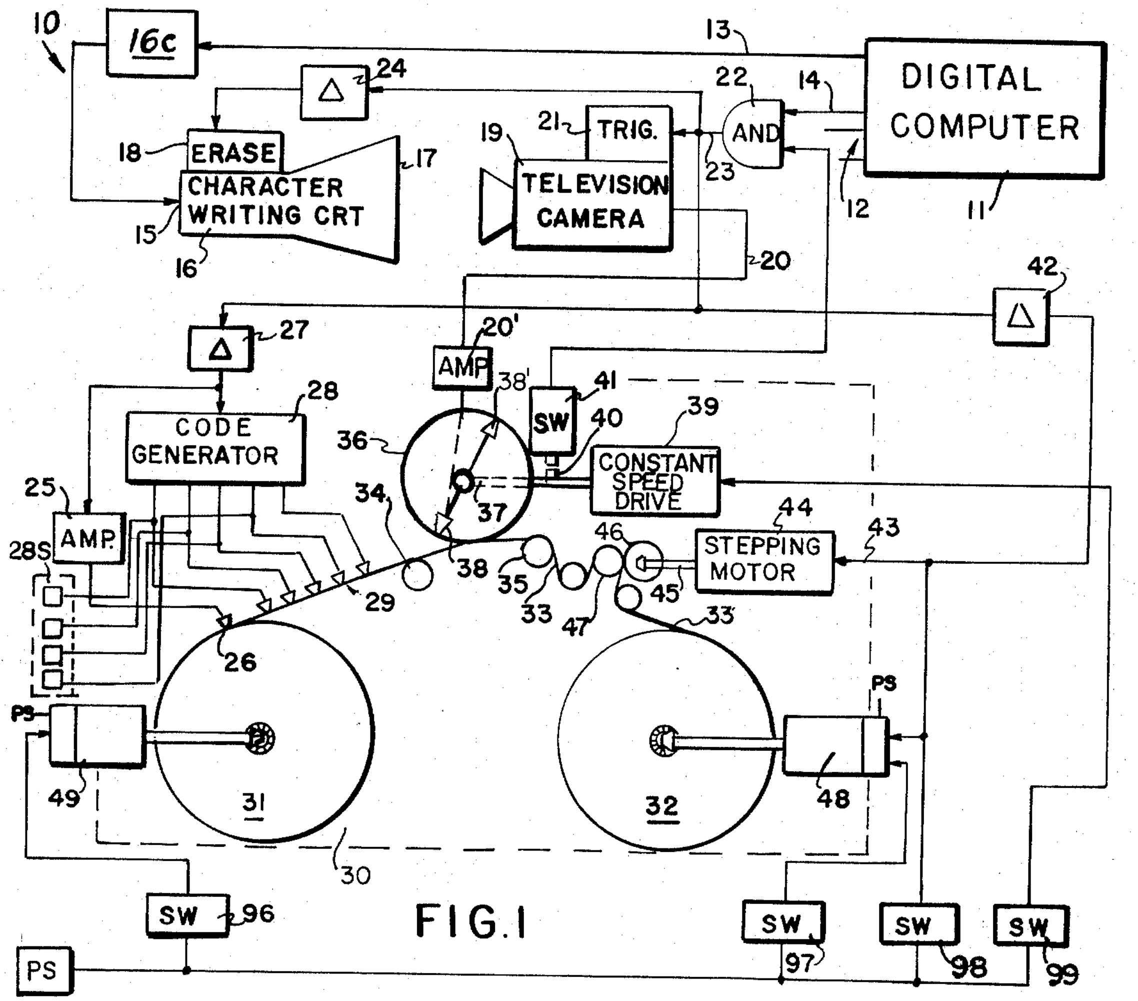
FIG. 1 is a schematic diagram showing one form of the invention employing a television camera to scan the face of a cathode ray tube to generate television picture signals of characters written thereon by the output of a digital computer and means for recording said television signals onto selected portions of a magnetic tape for storage purposes.

In the drawings, where not illustrated, it is assumed that the correct power supplies PS are provided on the correct sides of all switches, controls, motors, delays, relays, etc.

The instant invention empolys electrical apparatus for generating analog signals such as composite video picture signals including all the necessary sync, blank and equalizing signals for generating images of line or frame information on a conventional cathode ray monitor screen. The analog signals are generated by cathode ray scanning of the storage screen of a conventional image storage tube or so called shaped beam and character storage tube, the write beam of which has been modulated and deflection controlled with signals representative of digital information such as the results of computations of a digital computer or the output of an optical character reader. While various types of so called videotape magnetic recorders may be employed to record the line or frame video picture signals and marker or code signals to be used in the selective reproduction of selected video signals for monitoring and hard copy printing, a suitable recorder which may be modified as defined herein is the Norelco Model 3403 distributed by the Phillips Broadcast Equipment Corporation of Montvale, N.J. The recorder employs a drum containing a magnetic recording-reproducing head operable to scan oblique track areas of the tape on each of which a full frame video picture signal may be recorded and, accordingly easily reproduced at 15 to 30 frames per second while the tape is stopped.

Certain assumptions are made with respect to the apparatus to be described. Block diagrams are provided for the purpose of simplifying the drawings to define such components as drive motors, switches, controls, counters, delay relays and the like. Unless otherwise defined, all electrically operated components such as motors, switches, amplifiers, cathode ray tubes, television cameras, signal generators and delay relays are assumed to contain connections or controls for performing the desired functions in response to the described control signals or switch operation. Components and subsystems provided in one drawing but omitted from another drawing, where applicable, may be employed where so missing. In other words, while the several embodiments may contain additional components or subsystems not shown in all figures, these may also be applied to the circuitry of the other embodiments presented herein. Conventional motor stop, start and reverse controls are provided and are either manually activated or activated by pulse signals generated by the computer or the switching controls illustrated.

In FIG. 1, a system 10 is operable for converting digital information generated as coded pulse signals on an output of a digital computer 11 to analog or video signals each of which is representative of a so called frame of information and may be used to modulate the write-beam of a cathode ray image tube to generate a full frame of information in the form of many lines of characters such as those which would occupy a letter size page. The digital computer 11 is programmed and operative to generate code digital signals representing the results of its computations on a first output 13 and control signals for controlling the recording operation on one or more of its output lines 12. For example, signals may be generated by the computer just prior to initiating the generation of the signals resulting from its computing functions for starting operation of the motors for the magnetic recorder which will be described. Information signal output line 13 extends to the input 15 of a character writing cathode ray tube 16 such as the Charactron tube made by the Stromberg-Carlson division of General Dynamics Corporation or any suitable character writing image storage tube which may contain its own character generating mask or writing logic responsive to the digital character signals of the computer or a separate logic and signal generating unit 16C for generating deflection control signals for writing lines of characters on the display screen 17 of the tube in response to the character digital code signals of the computer. Facing screen 17 and operative to scan the images generated thereon is a television camera 19, the output 20 of which extends to the recording amplifier 20' of a videotape recorder 30 containing magnetic tape 33 on which full frame video picture signals are selectively recorded as they are generated and may be selectively reproduced for modulating the write beam of a cathode ray image viewing tube for monitoring or print-out purposes.

The videotape recorder 30 is preferably of the type in which the tape is driven around or against a rotating drum 36 having a magnetic head 38 supported thereby and operative to scan parallel tracks oblique to the longitudinal axis of the tape for recording and head 38' for reproducing from said tracks. The tape 33 may be driven at constant speed past or around the drum 36 while the computer 11 continuously generates character information signals which are continuously converted to lines of characters on the face of screen 17 and scanned line-by-line or frame-by-frame by the camera 19 to generate full-line or full-frame video picture signals which are recorded along separate portions of the tape 33 of the recorder 30.

In a preferred form, the recorder 30 is a modified version of the Norelco Model 3403, distributed by the Phillips Broadcast Equipment Corporation of Montvale, N.J., which provides for reel-to-reel drive of a one inch wide magnetic tape in a path which extends helically about a drum 36 which, together with a single recording head 38 is rotated on a shaft 37 at constant speed by a constant speed drive motor 39. The guide and drive means for the tape and drum and the drum mounted recording head 38 are so arrange that during each sweep or travel of the head obliquely across the tape wound helically about the drum, a full frame video picture signal generated by video camera 19 may be recorded thereon. Thus, if the tape is stopped with a selected oblique record track in alignment with the rotating head 38, a selected full frame composite video picture signal may be recorded on said oblique track or selectively reproduced therefrom a number of times such as at a frequency necessary to generate and maintain an image on a conventional cathode ray video monitor screen such as in the range of 15 to 30 cycles per second In FIG. 1, the video tape recorder 30 is modified and contains an intermittent drive means for the magnetic tape 33 which includes a stepping motor 44, the output shaft 45 of which is gear coupled to drive a capstan drive wheel 46 engaging the tape 33 against a depressor wheel 47 for intermittently advancing the tape each time the stepping motor 44 is pulsed. The drive is such that the tape is advanced, each time the stepping motor 44 is energized, a degree equal to the distance between the center of adjacent oblique tracks of the tape. As such, controlled operation of the stepping motor 44 may be utilized to position the tape and rotating head 38 to permit successively generated composite video picture signals derived from camera 19 to be each recorded in its entirety on a separate oblique track of the tape and to thereby be easily selectively identified and reproduced when needed to generate respective images on the viewing screen of a cathode ray tube for monitoring or hard copy generating purposes. Notation 48 refers to a take-up motor and suitable tape tensioning means coupled to the shaft of a take-up reel 32 for the recorder 30 for intermittently driving the tape received from the capstan-depressor drive means described onto the take-up reel. Notation 49 refers to a controllable motor operative to drive tape supply reel 31 to rewind the tape thereon prior to removing and replacing same or prior to performing a frame searching operation. Notations 34 and 35 refer to idler guide rolls and guide means operative to guide the tape from supply reel 31 to its helical guide means around drum 36 and therefrom onto reel 32. Manual switches 96–99 control motors 49, 48, 43 and 39 in manually operating the recorder.

Control of the apparatus of FIG. 1 is effected by automatically positioning a first portion of the tape around and against rotating drum 36, initiating scanning the image on the face of image screen 17 with camera 19 and generating a composite video picture signal on the camera output 20 when the recording head 38 has just started to scan the beginning portion of the oblique track of the tape 33 with which it is aligned so that the full frame video picture signal generated will be recorded in its entirety along the single oblique track of the tape aligned with the head.

Typical control means necessary to control recording operations are illustrated and may be described by describing a recording cycle as follows:

Digital code signals are generated as series codes on output 13 of computer 12 and are applied to write lines of characters on the face or screen 17 of tube 16. When a full frame of lines of characters or a predetermined number of character lines has been recorded on screen 17, the computer 11 generates a control signal on a second output 14 thereof which is fed to one input of a logical AND circuit 22 and is of sufficient time duration to permit the drum 36 to rotate at least once. A cam or scanning mark 40 is provided on the drive shaft 37 for drum 36 and is utilized to activate a limit switch 41 when the drum is positioned in its rotation such that the head 38 thereof has just rotated into scanning relationship with the starting end of the track it is aligned with. The output of limit switch 41 is connected to the other input of AND circuit 22 so that when the limit switch is activated and the output 14 is energized, a control signal is generated on the output 23 of 22 and is fed to a trigger circuit 21 for the camera 19 which initiates video scanning of the image screen 17 and the generation of a full-frame composite video picture signal on output 20 thereof. The composite video picture signal is thus fed to recording head 38 of the video tape recorder 30 during the time it takes to scan the oblique track of the tape with which it is aligned and is recorded thereon. The output signal of AND circuit 22 is also passed through a delay relay or a delay line 24 connected to the erasure control 18 of character writing tube 16 to condition it immediately after the reading operation has begun to receive new recordings of the next frame of character lines.

To advance the tape 33 so that the next oblique track thereof is aligned with the rotating recording head 38, the control signal generated on output 23 of AND circuit 22 is also passed to a delay line or delay relay 42 which operates stepping motor 44 by pulsing the input 43 a time interval after the energizing of delay 42 sufficient to permit the head 38 to complete its recording sweep of the track of tape 33 it is scanning so that the entire video picture signal may be recorded thereby onto the tape, thereby advancing the tape one track width so that the next oblique track of said tape is aligned with the recording head. If the digital computer 11 is operative to provide output signals capable of generating lines of characters substantially continuously with sufficient delay periods between each group of character lines defining separate frames or pages of information to permit the tape to be step advanced as described, then the tape and video camera may be operated in substantially synchronized relationship at frame rates equal to or higher than standard television frame rates of 30 or 60 frames per second.

Frame locating signals may be recorded on a longitudinal track extending along a border portion of the tape by also passing the pulse output of AND circuit 22 to a recording amplifier 25, the output of which extends to a recording head 26 which is fixedly mounted to engage a portion of the tape 33 comprising a strip-like portion of the tape width adjacent a border thereof extending beyond the described oblique recording tracks thereof and defining one or more longitudinal recording tracks on which frame indicating pulses and/or parallel bit codes may be recorded. A delay line 27 is provided to receive the pulse signal output from the AND circuit 22 and delay its passage to the oblique-track-frame-location-signal recording head 26. The delay is provided to account for the time it takes for the stepping motor 44 to operate and move the tape 33 after the energizing pulse from AND circuit 22 is applied thereto so that the recording head will become energized while the tape is in motion.

The output of delay line 27 is also shown connected to the energizing input of a parallel binary code generator 28 which, each time it is energized by a pulse on its input, generates a parallel code, such as a binary digital code representative of one of a series of consecutive numbers, on its outputs 28' which are connected to a bank of recording heads 29 extending across respective tracks of the described border code recording areas of the tape. In perhaps its simplest form, the code generator 28 may comprise a magnetic tape reading units containing a bank of magnetic pickups operable to read codes recorded along the length thereof at equispaced intervals whereby each code is generated in succession each time an input pulse is received from the delay relay or line 27. The input pulse is applied to activate a stepping motor operable to drive the tape advancing capstan or other means so as to advance the tape one code location or interval to permit reproduction of the next code recording therefrom. Thus both frame locating signals and code signals for identifying the frame numerically may be simultaneously recorded adjacent or between each oblique recording track to be used, when reproduced thereafter from the tape 33, in selectively reproducing full frame video picture signals for monitoring the recorded digital information. Reference is made to by copending application Ser. No. 225,173 for details of how the apparatus of FIG. 1 may be operated to effect the selective reproduction of full frame video picture signals from the tape 33 and the visual monitoring thereof. Notation 28S refers to a bank of manual switches operable for programming the code generator 28 to generate, when activated as described, specific codes for cross referencing and other purposes along selected portions of the tape 33.

It is noted that the means generating an end-of-frame indicating signal on input line 14 to AND circuit 22 may comprise a self-resetting counter operative to count the character code signals generated on output 13 and to generate a pulse to control tape movement each time a predetermined number of characters have been generated by the computer equivalent to filling a frame of the CRT 16. The signal generated on line 14 may also be generated by a clock at time intervals such that the constantly generated characters will substantially fill a frame o.e. filed of the CRT. Accordingly, the output 23 of AND control circuit 22 may be also extended to the control for tube 16 which deflection controls the write beam thereof to a start frame location.

Figure 2:
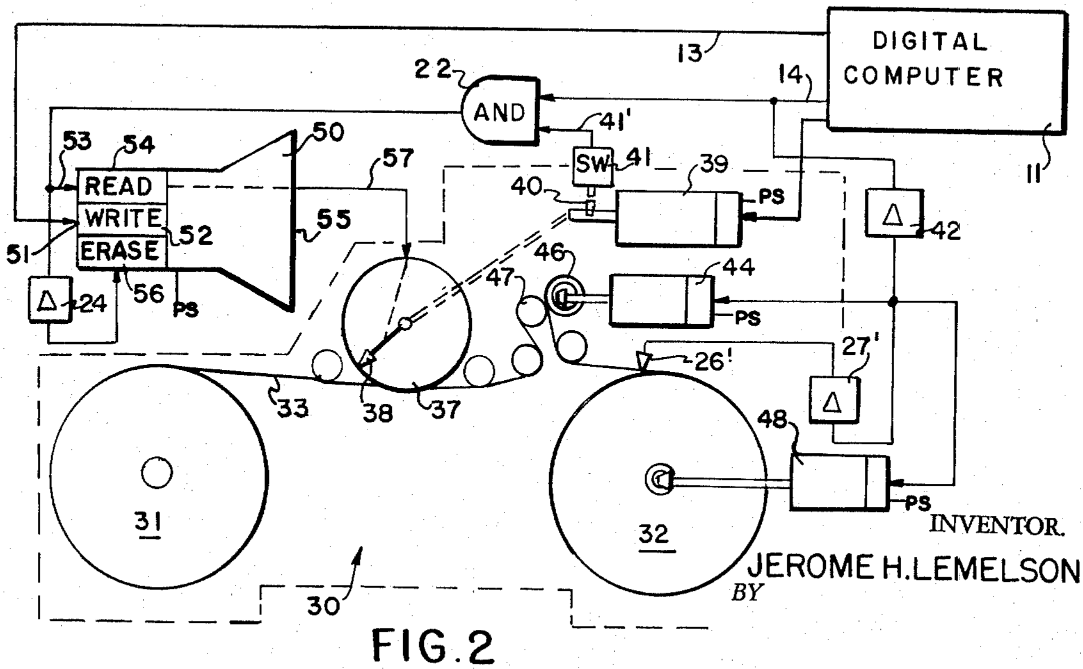
FIG. 2 is a schematic diagram of a modified form of FIG. 1 employing a read-write storage tube to generate analog information signals from digital signal generated information.

FIG. 2 shows a modified form of the apparatus of FIG. 1 wherein a so called read-write storage tube 50 replaces the video camera reading a character writing tube screen of FIG. 1 to generate video picture analog frame signals. The tube 50 include suitable beam intensity and deflection control means and/or digital to analog conversion means for generating characters of the digital information received from the output 13 of a digital computer 11 on the storage element or screen 55 of the tube. The write-read tube 50 includes an information writing input 51 connected to a beam writing and control unit 52 of the type defined in the texts Display Systems Engineering published by McGraw Hall, Inc., Library of Congress, Catalog Card No. 67–17198, and Storage Tubes and Their Basic Principals by Knoll and Kazan, and is capable of forming lines of characters on the storage screen 55 in accordance with the digital code signals generated on the output of computer 11. A second input 53 extends to a reading control unit 54 which is operative, when input 53 is energized by a signal generated on the output 14 of computer 11, to cause a read beam to be generated within the tube 50 and to effect a full frame scan of the image screen 55 so as to generate a composite, full-frame video picture signal on an output 57 of said tube. The output 57 extends to the recording amplifier or head 38 of a video tape recorder 30 of the type described above or to a recording amplifier forming part of said recorder.

The means described in FIG. 1 for initiating generation of each video picture signal when the head 38 initiates its scanning sweep of the oblique channel of the tape it is aligned with, is provided in the system of FIG. 2 and includes logical AND circuit 22 having as one input, line 14 from a computer 11 on which an end-of-frame signal is generated and, as the other input, a line 41' extending from a limit switch 41 which becomes activated when it is actuated by a cam 40 on shaft 37 of the head drum 37 indicating that the head 38 has just initiated its sweep of the oblique channel of tape 33. The controls for stepping motors 44 and 48 for driving tape 33 and means for recording frame indicating pulses, are the same as those provided in FIG. 1. Suitable reproduction control means for the video tape recorder 30 are provided to permit the selective playback and monitoring of the recorded information wherein visual monitoring may be had by means of the storage tube 50 by viewing the screen 55 or an auxiliary monitor and hard copy producing means.

The recording apparatus illustrated in FIG. 2 is operative to continuously record video signals representative of frames of characters on magnetic tape. Recording is effected as or immediately after each frame of characters is recorded on the storage element or screen 55 of the write-read tube 50 by generating a read beam deflection control pulse and applying same to the input 53 to a read beam control unit 54 which contains the necessary deflection control circuits including horizontal and vertical deflection control signal generators and counters for causing the read beam of the tube 50 to initiate and complete one complete frame sweep of the storage screen 50 thereof. The read beam frame sweep control signal is generated when two inputs to logical AND switching circuit 22 are energized, one input 14 being derived as an output of computer 11 from a suitable counter or other means therein for generating a signal each time either a predetermined number of character signals are generated by the computer equivalent to the number necessary to fill a complete frame of recording area such as the field represented by the storage element 55 or a predetermined number of lines of such characters are generated in code form. The computer 11 may also be programmed to generate such a read beam deflection control initiating signal whenever a predetermined amount of selected or predetermined information has been generated or at the termination of certain types of information before or after one or more frames of the same information have been generated and recorded in response to signals generated by counters or other means indicating when a complete image field or frame has been filled. Such frame filling indicating means may also comprise a photoelectric detector disposed at the end of the last recording line of the tube screen 55 and operable to generate a signal when a recording is effected there opposite which signal is applied to the input to AND circuit 22. The other input to AND circuit 22 is derived as described from means sensing the position of head 38 as it is about to start its scan of a new oblique recording area of the tape. The output of AND circuit 22 is also passed to a delay relay 24 which activates the erase control 56 to erase recordings on screen 55 after they have been reproduced by the read beam as described.

Figure 3:
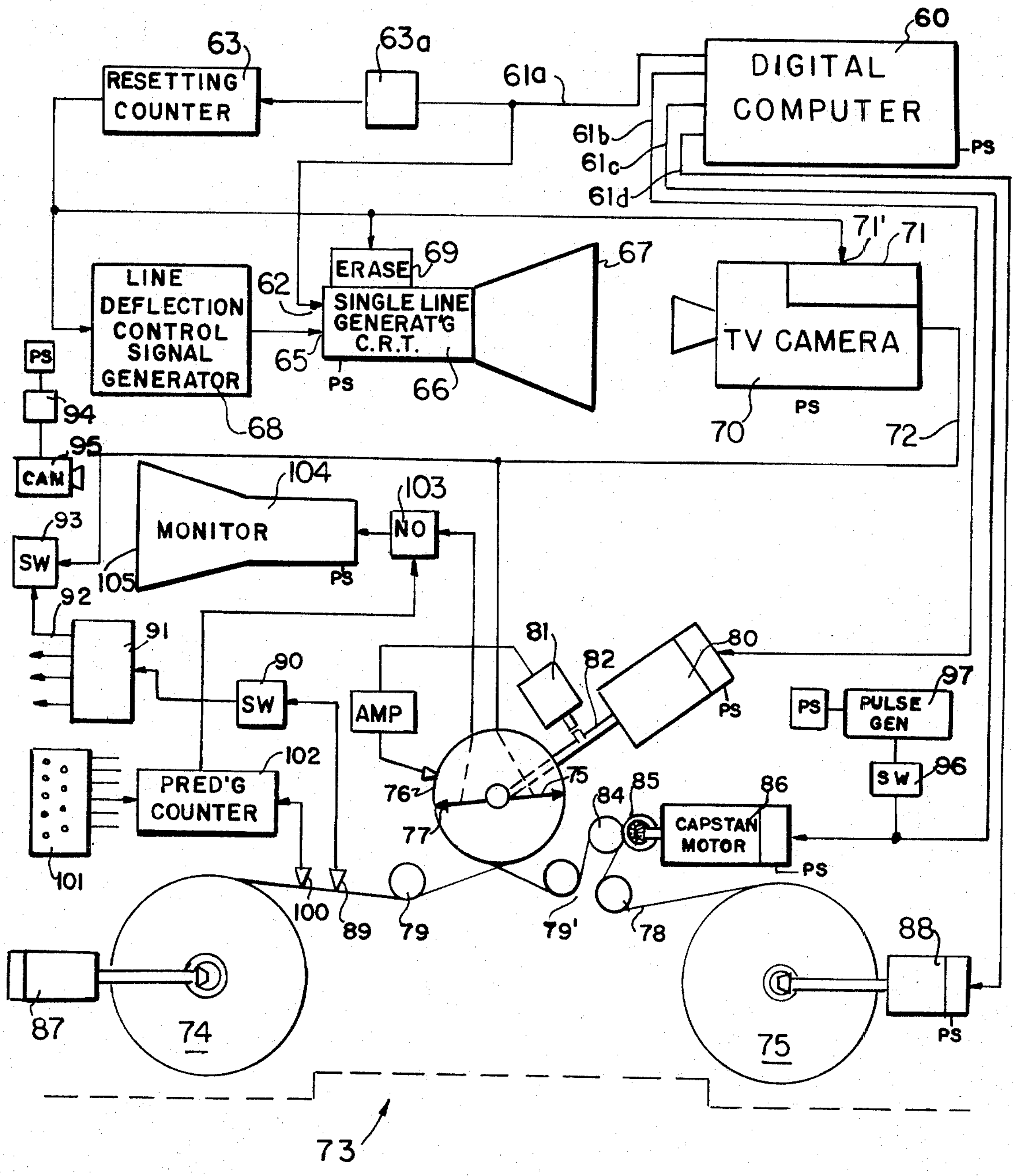
FIG. 3 is a schematic diagram showing a further modified form of the apparatus of FIG. 1.

In FIG. 3 is shown a modified form of digital to analog signal recording apparatus applicable for recording information in the form of analog signals representative of lines of characters such as the output of a digital computer or optical reader onto selected areas or track portions of a magnetic recorder so that said signal may be selectively reproduced per se, in groups or as sufficient lines to occupy frames of characters on the screen of a cathode ray tube. The digital computer 60 is operable to generate character signals, such as binary pulse codes, on its output 61*a* which extends to the digital-to-analog converter control input 62 of a character generating cathode ray tube 66 which is operable, as described, to sequentially generate characters as a line across the image recording screen 67 thereof. Generated between each character code by the computer 60 is a pulse signal of a different frequency than the signals representative of the code, which is passed to a tone responsive relay 63*a* in the line 61*a*, the output of which relay is connected to a self resetting counter 63 which receives a pulse therefrom each time a group of signals representative of a character has been generated by the computer. The counter 63 is operable to uncount and generate a control signal each time a predetermined number of characters equal to approximately a line of characters has been generated by the computer and thereby provides a control signal for triggering the line deflection control signal generator 68 the output of which connects to the input 65 of the line deflection control circuits of the cathode ray tube 66. The counter 63 may be replaced by a timer or driven by clock signals generated by the computer if the computer is operable to generate character signals at a relatively constant rate so that the timer or counter generates the described control signals at intervals during which a sufficient number of characters have been generated to completely fill a line of the storage element of tube 66.

The output of counter 63 is also passed to activate input 71' of a deflection control circuit 71 for a television camera 70 which is operable, each time it is activated to cause the read beam of the camera to scan just that area of the screen 67 of the cathode ray tube 66 on which is recorded the single line of characters generated just prior to the generation of the control signal passed to trigger input 71' to the deflection control circuit 71. The video signal output of camera 70, an analog representation of the line of characters generated on the screen of the CRT 70 is passed to the recording head or transducer 76 of a magnetic recorder 73 and is recorded on a selected track or portion of a track of a tape 78 which is driven at constant speed past the recording head. The recorder 73 may comprise a helical scan videotape recorder such as the Philipps Norelco Model 3403 having a rotating drum which supports the head 76 and about which the tape 78 is helically driven to generate parallel record tracks obliquely across the tape each one of which tracks or selected portions thereof define areas on which each of the analog signals representative of said lines of characters are recorded.

Notation 61*b* refers to a second output of computer 60 on which output a signals or signals are generated for either starting, pulsing or continuously controlling the operation of tape capstan motor 86. Other outputs 61*c*, 61*d* and 61*e* of the computer 60 respectively connect to the controls for recording head drum drive motor 82, take up reel drive motor 88 and tape supply reel drive motor 74 and suitable signals are generated on these outputs by the computer to properly control same such that the analog signals representative of one or more lines of characters defining information generated by the computer may be properly recorded on the tape 78. Oblique track marker signals are recorded on a longitudinal track adjacent each oblique track by a stationery head 82 the input to which is connected to a sensor or limit switch 81 which is activated by a mark or cam on the shaft 82 of the head drum drive motor 80 thereby effecting a marker pulse recording adjacent each oblique track of the tape 78. Notations 79 and 79' refer to idler rolls and guides for the tape transport of the recorder 73.

An erasure control 69 for the information recorded on the screen 67 of cathode ray tube 66 is also connected to receive the pulse output from counter 63 to automatically effect erasure of the recording on screen 67 prior to recording a new line or lines of characters thereon. By providing the counter 63 adjustable, a plurality of lines of characters may be recorded on the screen 67 of the CRT 66 before or during the scanning thereof by the television camera 70 if timing or suitable count signals are generated by the computer or auxiliary counting means and fed to the line deflection control signal generator 68 to properly deflection control the write beam of tube 66 at the end of each line of characters generated on its storage screen.

Also provided in FIG. 3 are control means for reproducing selected video signals recorded on the tape 78 and applying said signals to generate one or more lines or selected frames of selected lines of information on the face of a monitor such as a viewing cathode ray tube 104. A control panel 101 contains respective switches for controlling the operation of the magnetic recorder reel motors 74 and 75, the drum motor 80 and the capstan motor 86. Also provided on control panel 101 are switches for presetting a predetermining counter 102 or a code matching relay which is operable in response to signals generated by a pick-up 89 scanning a frame or code marker recording track of the tape to generate a control signal when a selected length of the tape containing a selected recording or recordings comes into operative relationship with the video signal pick-up head 75 which is mounted on drum 76 of the recorder 73. The output of head 75 which is operable to continuously scan video signal recordings on the tape during monitoring functions, is connected to a normally open switch 103 which is operable to close and remain closed for a predetermined period of time after receipt of a signal from the counter or controller 102. The time said switch 103 remains closed may be such as to allow the passage a selected analog or video signal therethrough to the image storage tube 104 which is equivalent to one line, a selected number or lines or a number of lines of characters equivalent to a frame of information or capable of completely recording on a filling the screen 105 of the image storage tube 104.

While the outputs 61*c*, 61*d* and 61*e* of the computer have been defined as connected for gating controls signals for controlling operation of the various drive motors of the recorder 73, it is noted that the tape may also be stepped by stepping motor means as described or controlled in its travel past the rotating drum 76 containing the recording head 77 by signals generated by a counter (not shown) connected to the output of counter 63 and operable to generate said signal for stepping or controlling operation of the tape drive motor 86 each time a predetermined number of video signals or a video signal is generated equivalent to characters filling the face of the storage cathode ray tube 66 so that full frames of information or a predetermined number of lines of information are recorded on each oblique track of the recorder 73.

The computer 60 may also be programmed or otherwise operable to generate a sufficient number of pulse signals to uncount counter 63 after less than a line of characters have been generated and recorded on the face 67 of tube 66 such as when the last character of a particular computation or group of information has been generated. This function may be effected by passing clock pulses on a separate output to the counter 63. Such clock pulses may be those normally generated to operate the computer or otherwise generated thereby, operative to initiate operation and stopping of the video tape recorder 73 in response to signals generated by the computer 60.

Notation 89 refers to a magnetic pick-up riding against a separate channel of the tape for detecting a control signal recorded thereon near the end of the tape. The output of pick-up head 89 extends to activate a switch 90 which, when closed by the control signal generated by head 89, activates an automatic controller 91 comprising a multi-circuit timer having outputs 92 extending to the start controls for the drive motors of a second videotape recorder (not shown) similar to recorder 73 and switching means 93 for switching the output 72 of the video scanner 70 to the recording head of said second recorder so that the recording function may be continued on the tape thereof.

It is noted that the combined cathode ray tube 66 and video scanner 70 of FIG. 3 may be replaced by a single write-read storage tube of the type provided in FIG. 2 with the read beam output of said tube connected directly to the recording input of the video tape recorder 73 and the controls similar to those illustrated in FIG. 3 for controlling operation of the reading beam thereof to scan each line of characters as it is written on the screen of such tube to generate continuously analog video signals of the lines of characters.

The video tape system of FIG. 1 may also be modified to record video signals of documents which are individually fed to the image field of the video camera 19 either manually or automatically wherein the stepping motors driving the magnetic tape are activated by pulses derived either by manual means or means for sensing each document as it enters or becomes centered in the scanning field of the video camera.

Also illustrated in FIG. 3 is a hard copy printer 95 such as a camera having a lens focused to receive light from the monitor screen face 105 or any suitable copy maker operated by a manual switch 94 to make prints of the image of the face 105. The switch 94 may also be operated by a signal generated by the digital computer 60 when, for example, certain computational results are generated. The output 72 of television camera 70 may also extend directly to the monitor 104 through a switch, not shown, which is controlled by the computer or person monitoring the information for directly generating the results of computation by bypassing the recorder, when necessary.

FIG. 3 also provides means for switching the output of camera 70 to a second magnetic tape recorder when the tape 78 of the recorder 73 is completely filled with video signals generated by the computer 60. Magnetic pickup 89 riding on a separate control channel of the tape 78 detects an end-of-tape recording and generates a signal which activates a multi-circuit timer or similar controller which operates a switch 93 gating the output 72 of camera 70 to the recording head of another recorder similar to 73 and also generates signals for controlling operation of the motors driving the other recorder and the power input to the recording amplifier thereof.

Notation 96 refers to a manual switch which, when closed, gates the output of a pulse generator 97 to the input of capstan motor for driving same at high speed to attain a selected portion of the tape for monitoring information recorded thereon.

It is noted that the end-of-tape recording reproduced by head 89 may be so located on the tape that the multi-circuit time or controller 91 which is activated by the reproduction of said recording will be able to control the operation of the second magnetic tape recorder to attain recording speed and switch 93 to close before the end of tape 78 has been reached so that the output generated by computer 60 may be continuously recorded without noticeable interruption.

Figure 4:
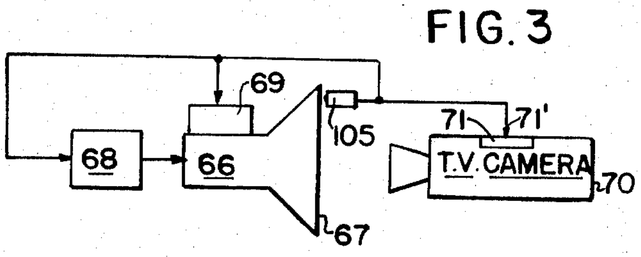
FIG. 4 is a schematic diagram showing a modified form of controlling the video signal generator of FIGS. 1 to 3.

In FIG. 4 is shown a modified form of the apparatus described herein wherein a detector, such as a photoelectric cell and appropriate control circuit, is employed to detect the writing of a character as described either at the end of a line, predetermined number of lines or frame defined by a predetermined area of the screen of the line or frame generating cathode ray tubes. The detector is operable to generate a control signal upon detecting a character at its scanning location, which control signal is applied to the line or frame deflection control signal generator associated with the described television camera or read beam of the same tube to effect generation of the described line or frame composite video signals, and/or to trigger the line or frame deflection control signal generator to return the write beam to the line or frame start-scanning location. The shaped beam and character cathode ray tube 66 is shown in plan view with a photoelectric detector 105 composed of a photoelectric cell and control circuit located at the end position of a character line or frame location on the face 67 of the tube and adapted to become energized and generate an output signal when light falls thereon from the character appearing at said location. The output of detector 105 extends to the trigger input 71' of the described deflection control signal generator 71 of the television camera 70 and also to the line or frame deflection control signal generator 68 for the shaped beam and character cathode ray tube 66, thereby eliminating the need for use of the described counter controller or suitable computing circuitry in the digital computer 60 for generating the necessary control signal for effecting both the read and write functions described. The arrangement of components of FIG. 4 may be applied to either the systems of FIGS. 1 and 3 or to the tube 50 of FIG. 2 wherein detection of the last character of a line or frame by the detector 105 may be operable to trigger operation of the read beam deflection control circuitry 54 as described.

In addition to using a helical wound video tape recorder, other types of video tape recorders may also be utilized for the purposes described. The control means described may be modified to accommodate and properly control such other types of tape recorders. Furthermore, means other than videotape magnetic recorders may be employed to record the described video information in analog form such that it is reproducible as analog electrical signal for use as described.

It is also noted that in addition to employing a digital computer to generate the described character signals, various types of electro-optical character readers for reading printed information such as information provided on accounting or business transaction forms, may be employed to generate the described binary digital signals applied to the recording means and analog-to-digital conversion means described.

If a longitudinal recorder is employed wherein the video recording head or heads are mounted stationery and the tape is driven longitudinally therepast, the character generating signal generated on the output of the computer may be continuously generated and recorded on the tape as they are generated wherein the computer serves to generate signals for starting and stopping the tape drive motors prior to initiating the computational signal generation and after such signals are terminated therefrom. Frame or line marker signals may be generated by the computer or auxiliary counting means operable to count character signals and/or lines of characters and to feed said signals to marker signals recording means such as one or more magnetic recording heads disposed to scan an adjacent channel or channels of the tape and record the marker signals thereon. When reproduced, the marker signals may be applied to uncount control counters for selectively producing one or more lines of information from the tape or a selected frame or frames thereof.

If a magnetic recorder is employed having a rotating magnetic head such as a helical scan recorder of the type described or other suitable type of rotating head recorder is employed for receiving and continuously recording alpha-numeric data generated by a digital computer, one or more marker or code signal recording heads may also be mounted on the head drum so as to rotate with and adjacent to the video signal recording head or heads and record marker signals and in certain instances code signals adjacent each predetermined number of characters generated such as the characters present in a line thereof or a predetermined number of lines such as those which would occupy a letter size page. By providing such marker signal recordings, reproducing same as the tape is scanned and feeding the reproduced pulses to uncount a preset counter, the signal generated when the counter uncounts may be used to control the reproduction of a selected line of characters, groups of lines of characters or a video picture signal capable of generating a full frame of video information on a conventional video monitor screen such as a conventional cathode ray tube forming part of a television receiver or storage tube.

In yet another embodiment of the instant invention, a recording arrangement is possible wherein the digital computer does not generate frame control or marker generating signals. This may be effected by providing a rotating head recorder with at least two video signal magnetic recording heads so that at least one head is always in engagement with the magnetic tape and gating the video signals generated by the reading tube or the video camera scanning the image screen first to one head and then the other with perhaps some degree of overlap in recording so as to avoid the possibility of loss of one or more bits of information or characters present in the video signal.

In still another form of the invention, two video writing storage tubes with respective read beams may be employed whereby information of the type described may be recorded on one while a frame, line or group of lines of character information previously recorded on the other is being read to generate a video picture signal which is recorded on the continuously running tape. A single recording tube with two storage elements and one read beam for both may also be employed wherein the read beam first scans one and then the other and switches from one to the other in a manner so as to prevent the loss of information. Also, a video read-write tube may be employed wherein a write beam writes information continuously and a read beam follows the write beam and scans each line scanned by the write beam or each character formed thereby immediately after it is written or after the writing of each line of characters generated on the storage element of the tube to continuously generate video signals which are recorded continuously by a rotary or stationary head magnetic recorder.

If a rotary head video tape recorder is employed, the tape may be stopped at any selected location while the read head of the drum repeatedly scans that section or track of the tape aligned therewith so as to generate the video signal being reproduced at a frequency such as to permit it to modulate the image screen of a conventional or high resolution cathode ray tube by modulating the write beam thereof at video frequency (15 to 30 frames per second) necessary to generate such a still image. If the tape is drawn at relatively slow speed past or around the head drum, the lines of characters generated by the video recordings as they are reproduced may be easily scanned by eye.

Figure 5:
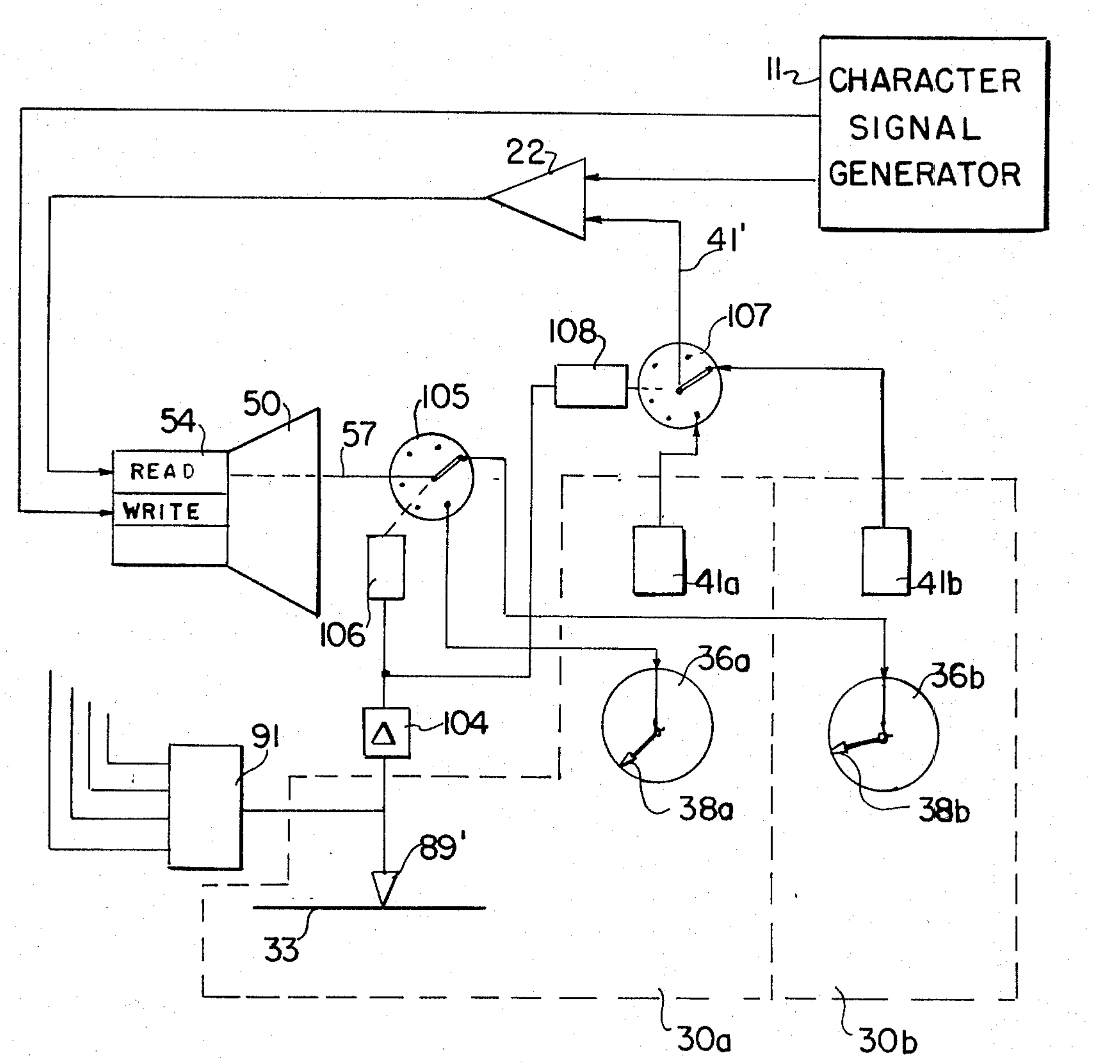

In FIG. 5 is shown a control arrangement for switching the recording operation of an apparatus of the type shown in FIG. 2 from one magnetic recorder when its tape has substantially played out to a second recorder. The recorder having its tape 33 substantially played out and recorded on its denoted **30*a* and contains all of the control and operational components illustrated in FIG. 2 including manual switch means for operating same in the reproduction mode. The second recorder, denoted 30*b*, contains similar control and operational components as 30*a* and is held in the standby mode while signals are recorded on the first recorder. When the signal near the end of the tape 33 is reproduced by magnetic pick-up 89' it is passed immediately to the multi-circuit timer 91' which it activates and which operates thereafter to control recorder 30*b* and initiating operation of its drive motors to place it in the operational mode. The output of head 89' is also passed to operate a plurality of switches to switch the output 57 of the read-beam of storage tube 50 from the recording head 38*a* of the recorder 30*a* to the recording head 38*b* of the recorder 30*b*. The switch 105 may comprise an electro-mechanical rotary stepping switch or its electronic equivalent having a solenoid 106 or other suitable control for stepping and switching circuit 57 from the input to head 38*a* to the input to head 38*b* when a signal is received thereby from head 89' after passing through delay 104, the duration of which delay is sufficient to allow timer 91 to condition recorder 38***b* for initiating recording. The output of delay relay 104 is also applied to activate a second rotary stepping switch 107 by activating its solenoid 108 thereby passing the output of the drum scanning limit switch 41*a* associated with head 38*a* of recorder 30*a* to ground and switching the output of drum scanning limit switch 41*b* of recorder 30*b* to the line 41′ extending to the AND logical circuit 22 so that the read-beam control 54 will be activated in synchronization with the rotation of drum 36*b* of recorder 30*b*. Thus each frame of information representative of pages of characters generated by the computer 11 will be recorded on respective oblique tracks of recorder 30*b* just as frames were recorded on respective oblique tracks of the recorder 30*a*. It is obvious that any number of magnetic recorders may thus be connected together to operate in sequence, one after the other and each after the tape of the previous recorder has substantially run out by cascading control means of the type shown in FIG. 5. If longitudinal recording means is provided for each recorder or the information such as line video signals of the type generated in FIG. 3 are provided rather than the oblique recording means of FIGS. 1 and 2, then the switching control signal may be generated by logic circuitry which receives an end-of-line or end-of-frame signal and applied same to an AND circuit together with the end-of-tape signal generated by head 89 to effect the described switching from one recording head of one recorder to that of the next recorder to be employed.

I claim:

1. An apparatus for recording information generated by a computer comprising:

(a) means for generating information in the form of electrical pulse signals defining coded data, (b) means for receiving said electrical pulse signals and converting selected portions thereof to respective video signals, (c) a recorder including a record member and a recording transducer coupled to record signals on said record member, (d) said converting means being operatively connected to said transducer, (e) said transducer being operative to receive and record said video signals onto selected portions of said record member, (f) reproduction transducing means for reproducing said video signals, (g) means for recording a plurality of locating signals on said record member which locating signals identify respective of said video signals recorded on said record member, (h) pick-up means for said locating signals, (i) monitor means for displaying images of the information represented by said video signals, and (j) selection control means connected to receive reproductions of said locating signals generated by said pick-up means and operable for effecting the reproduction and transmission of selected recorded video signals to said monitor means whereby the digital information represented by a selected video signal may be displayed by said monitor means.

2. Apparatus in accordance with claim 1 said means for generating information comprising a digital computer.

3. Apparatus in accordance with claim 1 said converting means comprising a cathode ray tube having a write beam for generating video information and a storage screen for storing video information, said means for reading said data comprising a read beam for said tube, deflection control means for said write beam operative in response to said electrical code signals for generating character recordings on said storage screen, which recordings are representations of said code signals, and means for deflection controlling said read beam to generate video signals of the character recordings on said storage screen.

4. Apparatus in accordance with claim 3 including vertical frame synchronizing signal generating means for deflection controlling the write beam of said cathode ray tube to repeatedly scan the storage screen thereof for generating a plurality of parallel lines of characters on said storage screen, control means operative to cause said means for generating data to generate said data, and means for applying said vertical frame synchronizing signals each time they are generated to activate said control means and cause said data generating means to generate data for modulating said write beam to record said characters on said screen.

5. Apparatus in accordance with claim 3 said means for generating said electrical code signals comprising a digital computer, and a synchronization signal generating means for generating sync signals in timed relationship to cause said write beam to repeatedly scan said screen at a fixed frequency, said data generating means being controlled and operative in a manner to cause the write beam of said cathode ray tube to predeterminately record lines of characters on the storage screen of said tube.

6. Apparatus in accordance with claim 3 including means for generating said character recordings as a plurality of lines of visual characters on said storage screen, and means for deflection controlling said read beam to read one line of characters after the other so as to generate a video picture signal having progressive portions thereof containing information representative of the information defined by respective lines of said characters.

7. Apparatus in accordance with claim 6 wherein said means for generating data comprises a computer operative to generate code signals representative of characters for an extended period of time means for deflection controlling the write beam of said cathode ray tube to generate a predetermined number of parallel lines of said characters to determine a frame of information occupying substantially the entire storage screen of the tube, and means operative in response to the writing information on the storage screen of the tube to cause the read beam of the tube to read the full frame of information recorded on the storage screen of the tube and to generate a full frame video picture signal derived by scanning the information recorded on the storage screen of the tube, said means for recording said information locating signals being synchronized in its operation to the operation of said read beam whereby said locating signals are predeterminately recorded on said magnetic recording member with respect to each video signal recorded thereon.

8. Apparatus in accordance with claim 7 said means for generating said electrical code signals representative of said characters defining said data and said information locating signals comprising a computer.

9. Apparatus in accordance with claim 7 said means for generating said electrical code signals representative of said characters defining said data comprising a digital computer, said means for generating said information located signals comprising auxiliary means, said auxiliary means being controlled in its operation to generate said locating signals by the data generated by said computer.

10. Apparatus in accordance with claim 7 including means for recording further signals on said tape indicative of the location in the video signal of each line of character information generated in the storage screen of the tube.

11. Apparatus in accordance with claim 10 including means for reproducing said further signals indicative of the locations of said lines of character information, and line information reproduction control means responsive to the reproduction of said line indicating signals for reproducing selected portions of a video signal containing information representative of the information of selected lines of said characters.

12. A magnetic recording system for continuously recording information generated by a digital computer comprising in combination with a digital computer operable to generate pulse code signals representative of characters on an output thereof, a first storage means for continuously receiving said pulse code signals in the order they are generated by said computer and continuously converting same to serial recordings defining lines of characters represented by said pulse code signals, means for reading said first storage means and generating video signals containing analog representations of the lines of characters generated by the pulse code signals received by said first storage means, a second storage means including a magnetic recorder operable to receive said video signals as they are generated and to serially record said video signals on selected tandem portions of a magnetic recording member, video monitor means including a viewing screen modulatable by said video signals to generate images of lines of the characters defined by said video signals, means for recording locating signals at selected locations of said magnetic recording member wherein said locating signal recordings identify respective video signal recordings containing respective lines of character information, means for reproducing said locating signals, means responsive to said reproduced locating signals for effecting the reproduction and transmission of selected video signals to said monitor means to generate selected lines of characters on the viewing screen thereof for visually monitoring the information represented by said selected lines of characters.

References Cited

UNITED STATES PATENTS

| | | | |
|---|---|---|---|
| 3,569,617 | 3/1971 | Allen | 178—DIG. 22 |
| 3,387,084 | 6/1968 | Hine et al. | 178—DIG. 22 |

HOWARD W. BRITTON, Primary Examiner

U.S. Cl. X.R.

178—DIG. 22; 179—100.2 S; 340—324 A